United States Patent [19]
Taylor

[11] 3,985,510
[45] Oct. 12, 1976

[54] FLASH REACTOR UNIT

[76] Inventor: Fred W. Taylor, 60 Village Circle, Bartow, Fla. 33830

[22] Filed: May 28, 1974

[21] Appl. No.: 473,675

[52] U.S. Cl. ............................... 23/284; 23/277 R; 34/57 A; 110/8 A; 110/8 R; 110/8 F; 110/7 B; 423/235; 55/97; 55/225; 55/233; 210/71

[51] Int. Cl.$^2$ ........................ C02C 3/00; B01J 8/18; F23G 5/00

[58] Field of Search .......... 23/252 R, 277 R, 277 C, 23/284, 288 S; 110/8 R, 8 A, 8 B, 8 C, 8 E, 8 P, 8 F, 7 B; 34/10, 57 A; 423/235; 261/118; 55/97, 225, 233; 210/71

[56] References Cited
UNITED STATES PATENTS

| | | | |
|---|---|---|---|
| 2,586,818 | 2/1952 | Harms | 23/288 S X |
| 3,310,009 | 3/1967 | Jacobs | 110/8 A |
| 3,515,381 | 6/1970 | Foch | 110/8 F X |
| 3,559,379 | 2/1971 | Lambert | 55/223 X |
| 3,615,668 | 10/1971 | Smith, Jr. | 34/57 A X |
| 3,736,886 | 6/1973 | Menigat | 110/8 F X |
| 3,748,081 | 7/1973 | Hummell | 110/8 R X |
| 3,772,998 | 11/1973 | Menigat | 110/8 F |
| 3,818,846 | 6/1974 | Reese | 110/8 F |

Primary Examiner—James H. Tayman, Jr.
Attorney, Agent, or Firm—Cushman, Darby & Cushman

[57] ABSTRACT

A flash reactor unit includes a housing shaped to define a chamber therein in which gases and particulate matter are continuously circulated. A stream of hot, high velocity exhaust gas from a combustion chamber turbine is introduced into the chamber proximate the bottom thereof such that the gases are directed upwardly into the chamber. A cooling liquid such as, for example, sanitary waste liquid, is sprayed into the chamber proximate the top thereof. At the same time metallic waste objects, such as tin cans, are introduced to the chamber with the hot gases continuously circulating the metallic objects to thereby expose substantially all of the surface area of the objects to the chemicals in the hot gases and the liquid sanitary waste. The surfaces of the metallic objects form a reaction surface for generating insoluble salts from the hot gases, the metallic objects and the liquid wastes. The metallic objects are continuously ejected from the chamber as more metallic objects are introduced therein. The insoluble salts and hot gases are exhausted from the chamber, cooled and then separated.

6 Claims, 2 Drawing Figures

FLASH REACTOR UNIT

BACKGROUND OF THE INVENTION

This invention relates to a method and apparatus for treating waste materials including solids, liquids and gases. More specifically, this invention relates to a flash reactor for separating harmful chemicals from exhaust gases and for cooling the exhaust gases before emitting same into the atmosphere.

The treatment and disposal of man's waste and discard has become one of the major problems of this technological era. In the past, solid waste has primarily been dumped in land fills, however, because of contamination of adjacent streams and lakes resulting from seepage and runoff of decomposed garbage and other materials and because the value of land is increasing while land suitable for land fill operation is becoming scarce, new techniques for efficiently disposing of the increasing mass of solid waste generated by our society are required. One approach to the disposal of solid waste, as well as sanitary waste and other similar materials, lies in the combined and interrelated treatment of all such materials in a single plant. Thus, techniques have been invented, such as disclosed in copending U.S. patent application Ser. No. 291,029, filed Sept. 21, 1972, issued 5/28/74 as U.S. Pat. No. 3,812,794, which describes a method and apparatus for disposing of solid waste material by incineration. Such incineration techniques, however, have resulted in the generation of environmentally undesirable by-products such as hot gases which include harmful chemicals such as sulfur, chlorine and other such gases. Accordingly, there is a need for a method or apparatus for appropriately extracting such harmful chemicals from the exhaust gases of the incinerator before the exhaust gases are emitted into the open atmosphere. Further, because of the potentially damaging influence of hot gases on the environment, it is also highly desirable to provide a convenient and economical means for cooling the gases before they are emitted into the atmosphere.

Further, the efficient disposal of sanitary waste such as sewage has become an increasing problem. Typically, the sanitary waste is collected and transported to a sewage treatment plant which separates the organic material, dissolves solids and kills the germs within the sewage. The cost of removing the organic material and the dissolved solids from the raw sewage has increased because as attempts are made to remove an increasing percentage of polluting materials from sewage water, the cost increases rapidly. Further attempts to remove all of the polluting materials from the sewage water by mechanical or chemical processes have proven quite difficult. All of these processes produce a sediment or sludge which must be treated and disposed of in some manner. It, therefore, is desirable to provide an efficient method and apparatus for processing liquid sanitary waste.

In copending U.S. patent application Ser. No. 473,676, filed May 28, 1974 and entitled EVAPORATOR CONDENSER UNIT, now U.S. Pat. No. 3,930,960, a method and apparatus is disclosed for efficiently extracting potable water from hot exhaust gases and liquid sanitary waste. In addition, this application discloses a method and apparatus for effectively cooling hot exhaust gases. However, it does not disclose means for separating harmful chemicals from hot exhaust gases and for flash drying the particulate matter in liquid sanitary waste liquid and for separating the particulate matter from both the hot gases and the sanitary waste.

It therefore is an object of this invention to provide a method and apparatus for cooling and separating harmful chemicals from hot exhaust gases.

It is another object of this invention to provide a method and apparatus for cooling hot exhaust gases and flash drying the particulate matter in sanitary waste liquid.

SHORT STATEMENT OF THE INVENTION

Accordingly, this invention relates to a flash reactor which includes a closed housing which defines a reaction chamber therein. The housing includes walls formed of a refractory material to isolate the high temperatures on the inside of the chamber and is shaped to enhance the continuous circulation of gases and particulate matter within. A stream of hot, high velocity exhaust gases is introduced into the chamber at the bottom thereof, with the gases being directed upwardly within the chamber. Sanitary waste liquid is sprayed into the chamber at the top of the chamber with the sanitary waste liquid including particulate matter dispersed therein. Metallic waste objects, such as tin cans, are introduced into the chamber with the hot gases continuously circulating the metallic cans, thereby exposing substantially all of the surface area of the cans to the chemicals in the hot gases and the liquid waste. The surfaces of the metallic objects form a reaction surface for vaporizing the liquid waste and for generating insoluble salts from chemicals such as sulfur, chlorine and nitrogen of the hot gas stream, and the chemicals on the surface of the cans such as tin and iron oxide. The resulting insoluble salts, together with the vaporized sanitary waste water and the flash dried particulate matter of the waste water, are exhausted through the top of the chamber, cooled and the particulate matter, including the insoluble salts and the flash dried sanitary waste, are separated from the exhaust gases by means of a precipitator. As new cans are introduced into the chamber, cans already therein are continuously being removed, compressed and baled for recycling purposes.

The quantity of liquid sanitary waste sprayed into the upper portion of the chamber is controlled in order to cool the hot gases to a predetermined temperature. In addition, as the gases pass through an exhaust duct, a control means is provided for spraying cooling water into the gas stream to thereby cool the gas even further to a second lower predetermined temperature. Hence, when the gases are exhausted into the atmosphere, the temperature thereof is at an acceptable level, thereby causing a minimal disturbance to the environment.

DESCRIPTION OF THE DRAWINGS

Other objects, features and advantages of the present invention will become more fully apparent from the following detailed description of the preferred embodiment, appended claims and the accompanying drawings in which:

DETAILED DESCRIPTION OF THE PREFERRED EMBODIMENT

Figure 1:
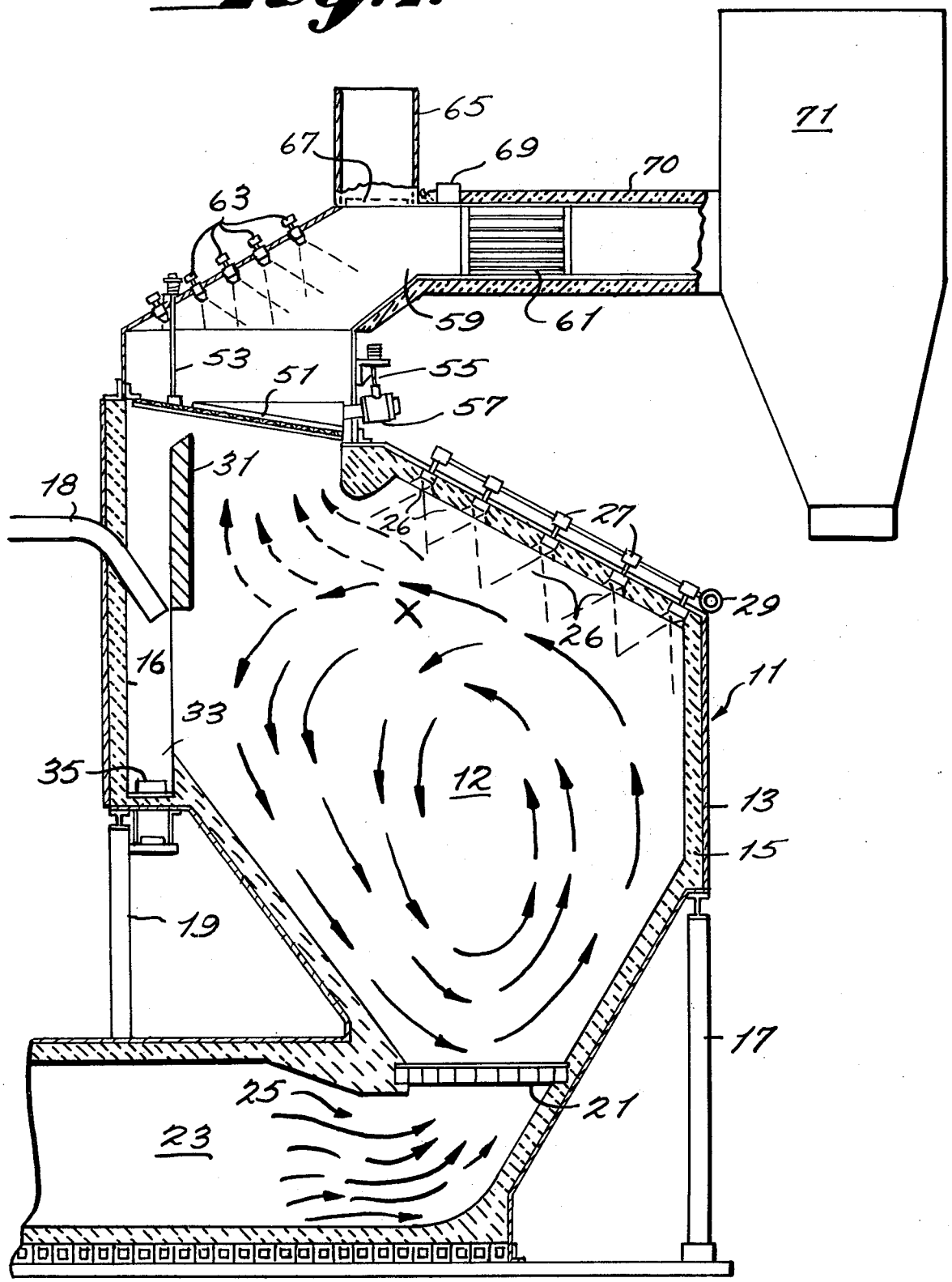
FIG. 1 is a side section view taken in elevation of the flash reactor unit of the present invention.
Figure 2:
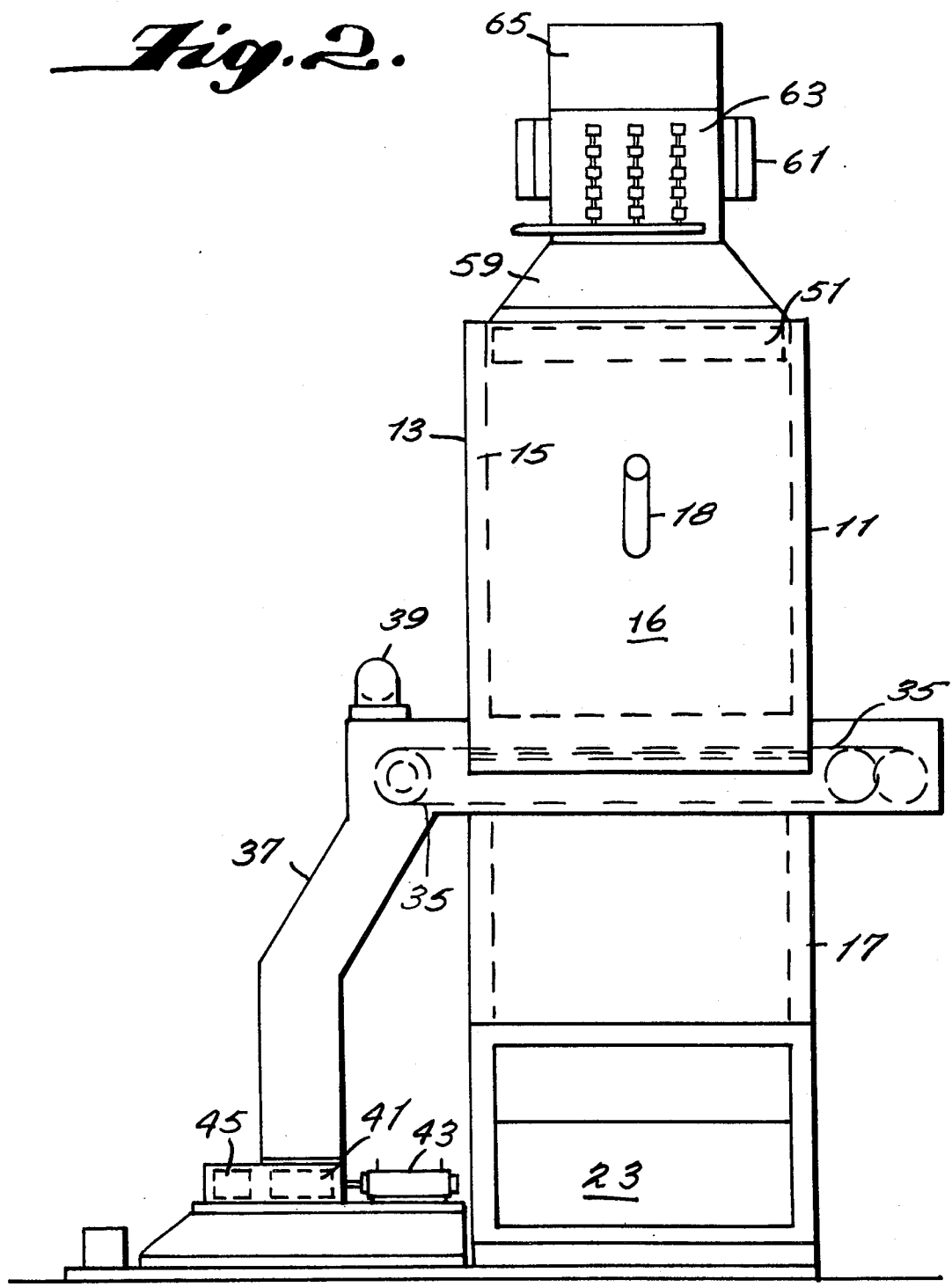
FIG. 2 is an end view of the flash reactor unit of the present invention.

With specific reference to FIGS. 1 and 2, the preferred embodiment of the flash reactor unit of the present invention will now be described in detail. The flash reactor unit includes a housing 11 which generally is in the form of an egg or an inverted pear to define therein a chamber 12 having a relatively small cross-sectioned area at the bottom thereof and a substantially larger cross-sectioned area in the middle and upper portions thereof. The housing includes a relatively thin outer metallic cover 13 which, in the preferred embodiment, may be as thin as 3/16 of an inch. Formed along the inside of the metallic cover 13 is an acid resisting high temperature refractory lining 15 which in the preferred embodiment is six to eight inches thick. Thus, the exceedingly high temperatures of the inside of the reactor chamber are isolated from the outside thereof. The housing, including the refractory lining and the metallic cover, is supported at its sides by means of vertical supports 17 and 19. At the bottom of the chamber 12 in the housing is an inlet for receiving hot gases at high velocities. The inlet is covered by a ceramic grating 21 which prevents large particulate objects within the chamber 12 from falling into the inlet duct 23 of the housing. The inlet duct 23 includes a venturi throat or orifice 25 for the purpose of increasing the velocity of the gases introduced to the chamber 12. As illustrated, the chamber 12 is in the form of an egg with a relatively narrow bottom cross-sectional area and a relatively wide upper cross-sectional area. The purpose for this is to increase the speed of the hot gases proximate the bottom of the chamber so that any particulate matter within the chamber will be continuously thrown upward in the chamber for reaction with the liquids and chemicals therein. Proximate the top of the chamber 12 and forming an inclined wall thereof is an array of spray nozzles 26, each having quick opening caps for cleaning and rodding. The spray nozzles are connected to valves 27, each of which communicate with the sewage inlet pipe 29. Liquid sewage is coupled to the valves 27 and then to the spray nozzles 26 from a sewage sump or from an evaporator-condenser unit such as disclosed in copending U.S. Patent Application, Ser. No. 473,676, filed May 28, 1974, now U.S. Pat. No. 3,930,960.

On the side of the housing opposite the array of spray nozzles 26 is the outlet of a pneumatic conveyor 18 which transports metallic objects, such as tin cans, from a hopper to the chamber 12. In the preferred embodiment, the metallic objects are blown into the reactor chamber. However, it should be understood that any other suitable means could be utilized for conveying the tin cans into the chamber.

Extending in a spaced relationship with respect to the wall 16 through which the tin cans are injected is a screen discharge chute 31 which directs sizable particulate matter, such as cans and other objects, downwardly into a trough 33. In the trough is a conveyor belt 35 as can be best seen with reference to FIG. 2, which continuously transports the objects directed into the trough 33 away from the chamber 12 toward a disposal chute 37. The conveyor belt, preferably of a cast steel drag chain type, is driven by means of a motor 39. The cans and other metallic objects, after being transported away from the chamber 12, are dumped into the chute 37 and under the force of gravity are conveyed into a compression chamber 41. A piston and cylinder arrangement 43 is provided for compressing the waste metallic cans and other objects in the baling chamber 45. The baling chamber and piston and cylinder arrangement 43 may be of any conventional type known in the art and are utilized for the purpose of baling the waste material for recycling in an induction furnace or steel mill.

Referring again back to FIG. 1, a vibrating wire mesh screen 51 is provided at the upper outlet of the chamber 12 which screen has 3/16 inch openings therein for screening out large particulate matter. The screen is mounted with respect to the outlet of the chamber 12 by means of a first spring and rod arrangement 53 and a second spring and rod arrangement 55. The screen is vibrated by means of a vibrator motor 57 which is of conventional design known in the art. In the exhaust duct 59 there is provided louvers 61 which are opened automatically in response to the output of a sensor (not shown) to introduce ambient air into the duct 59 for diluting the hot gases, thereby cooling the gases. In addition, an array of spray nozzles 63 are provided which inject water or waste sewage into the stream of hot gases flowing from the chamber 12 to cool the hot gases to a predetermined temperature. Should the spray from the nozzles 63 fail to cool the hot gases sufficiently, then the sensor (not shown) opens the air louvers 61 to permit the entry of cool, ambient air into the hot gas exhaust stream to further cool the gas stream down to the desired level. Should in an emergency the louvers or the spray nozzles 63 fail to operate adequately to cool the gases down to a preset temperature, an emergency by-pass stack 65 is provided with a gate 67, which is appropriately opened by means of an automatic gate opener 69 of conventional design to permit the exit of the gases into the atmosphere. The duct 59 is covered at all exposed surfaces with at least six inches of heat-resistant insulation 70. The output of the duct 59 is connected to a precipitator chamber 71 in which the insoluble salts and fine flash dried particulate matter is separated from the hot gases. The precipitator for separating the solid particles from the hot gases is of conventional design and accordingly will not be disclosed herein in order to more clearly and concisely disclose the present invention.

In operation, hot gases from a waste incinerator, from a fuel oil burning turbine, from the burner of a steam boiler, or other such combustion means is introduced into the chamber 12 via inlet duct 23. Typically gases from a waste incinerator are introduced at a temperature of 1800° F, whereas, gases from an oil-burning turbine engine are introduced at approximately 850°F. In order to provide for the proper circulation of F. tin cans within the chamber 12, a venturi throat 25 is provided to increase the velocity of the hot exhaust gases. Thus, the velocity of the gases being introduced to the chamber 12 may typically be as high as 8000 feet per minute, which velocity is quite satisfactory for circulating the tin cans and metallic particles introduced to the chamber via the pneumatic conveyor 18. As the gases rise upwardly from the ceramic grating 21 toward the array of spray nozzles 26, the speed of the gases gradually decreases until, at position X, the gases have a velocity of between 800 and 1000 feet per minute. Some of the gases are then recirculated downwardly toward the ceramic grating 21 and the remainder of the gases are exhausted into exhaust duct 59. Because the cross-sectional area of the chamber 12 is smaller near the bottom of the chamber, the speed of the gas stream increases so that when the gas stream is redirected upward again by the new gases entering the chamber, the speed thereof has substantially increased. Thus, the chamber is designed in an egg-shaped form so that the upward speed of the gas stream is sufficiently high to maintain relatively heavy metallic particles, such as the tin cans, continuously in circulation.

As the tin cans and other metallic particles are introduced into the chamber via conveyor 18, together with the liquid sewage via nozzles 26, the constantly exposed surfaces of the cans which include tin and iron oxide, are exposed to the sulfur, chlorine, calcium and other objectionable chemicals in the hot gas stream and to the dissolved solids in the sanitary waste liquid stream. Thus, the surfaces of the cans provide a reaction surface in which the particulate matter in the sewage spray is flash dried to solid particles and then exhausted from the chamber via exhaust duct 59. In addition, the surfaces of the cans provide a reaction surface for generating insoluble salts by combining the tin and iron oxide of the cans with the sulfur chloride, calcium and other objectionable chemicals in the gas stream. These insoluble salts are also exhausted from the chamber 12 via the exhaust duct 59. If desired, a base material, such as lime, can be selectively introduced into the chamber via pneumatic conveyor 18, spray nozzles 26, or via a separate opening in order to neutralize the acid formed within the chamber 12 by the coaction of the sewage and the hot gases.

The cans and other large particulate matter are from time to time directed upwardly against the wire mesh screen 51 and bounce back into the chamber and between the discharge chute 31 and the wall 16. Thus a portion of the cans are continuously being removed from the chamber 12 via the chute 31 and the discharge conveyor belt 35 positioned in trough 33. The fine particulate matter passes through the vibrating screen 51 and is exhausted via the duct 59 into the dust collector 71. The wire mesh screen 51 is vibrated in order to prevent particles from lodging between the meshes to thereby maintain the output opening of the chamber 12 in an unclogged state.

The hot gases introduced into chamber 12 are initially cooled by the relatively cool sewage liquid introduced into the chamber via nozzles 26. Thus, when the liquid of the waste sewage is vaporized, the energy required for vaporization of the liquid is extracted from the hot gases to thereby cool the hot gases. The gases are further cooled as they pass into the outlet duct 59 by the spray from the second array of nozzles 63. The spray from nozzles 63 may be water or, as in the preferred embodiment, may be liquid sewage waste. Thus, the energy required to vaporize the liquid introduced via nozzles 63 further cools the gases down to a desired temperature level. The temperature of the hot gas stream as it leaves the chamber 12 is typically 400° F, which temperature can be adjusted by controlling the quantity of cooling water introduced to the chamber via the spray nozzles 26. The gas is further cooled down to approximately 325° F by means of the liquid introduced to the spray nozzles 63. A suitable temperature detector and control mechanism of conventional design is utilized to control the amount of liquid passed through the nozzles 26 and 63. In case it is desired to further cool the hot gases or if the hot gases have not been cooled down to 325° F, a control means is provided (not shown) for opening the air louvers 61 to permit cool, ambient air to mix with the hot gases to further cool the gases before they are introduced to the dust bag collector chamber 71. As aforementioned, should the cooling mechanism of the present invention fail, an emergency by-pass stack 65 is provided for passing the hot exhaust gases to the atmosphere.

By way of example, but not in any sense to limit the scope of the invention, approximately 600,000 cubic feet per minute of hot gases are introduced into the chamber 12 via inlet duct 23. At the same time, approximately 300 pounds per hour of tin cans and other particulate matter are introduced to the chamber via pneumatic conveyor 18 and 285 gallons per minute of waste sewage is introduced to the chamber via nozzle 26. In turn, approximately 350,000 cubic feet per minute of cooled exhaust gases are conducted through the exhaust duct 59, with the inlet combustion gases initially at a temperature of between 800 and 1000° Farenheit being cooled down to 300° to 350° Farenheit. It therefore can be seen that the present invention provides an efficient means for eliminating harmful chemicals from the combustion gases of an incinerator and for separating particulate waste matter from raw sewage, and for cooling the combustion gases down to a temperature level acceptable for exhausting same into the atmosphere.

While the present invention has been disclosed in connection with a preferred embodiment thereof, it should be understood that there may be other obvious variants of the present invention which fall within the spirit and scope of applicant's invention as defined by the appended claims.

What is claimed is:

1. A flash reactor unit comprising in combination:
   an enclosed housing defining a reaction chamber therein, said housing having walls formed of a refractory material to thereby isolate the high temperatures of the inside of said chamber from the ambient temperature of the outside thereof, at least two opposing side walls of said chamber being sloped away from one another from the bottom toward the top of said chamber, the lower portion of said chamber being relatively narrow and the upper portion thereof being relatively wide to thereby enhance the vertical circulation of gases and particulate matter in said chamber,
   means for introducing a stream of hot, high velocity exhaust gases into said chamber proximate the bottom thereof and for directing said gases along one of said opposing side walls to force said gases upwardly within said chamber and then downwardly along the other of said opposing side walls,
   means for spraying sanitary waste liquid into said chamber proximate the top thereof, said sanitary waste liquid including particulate matter dispersed therein,
   means positioned remote from said exhaust introducing means for introducing metallic waste objects into said chamber, said hot gases continuously circulating said metallic objects substantially throughout said chamber thereby exposing substantially all of the surface area thereof to the chemicals of said gases and liquid waste, the surfaces of said metallic objects forming a reaction surface for generating insoluble salts from said hot gases and liquid waste,
   means for continuously conveying said metallic objects away from said chamber after reacting with said hot gases and sanitary waste, said conveying means including an open topped chute positioned on the side of said chamber opposite said one opposing side wall so that as said gases circulate in said chamber, said metallic waste objects are deflected into said chute and conveyed away from said chamber, and means for exhausting said hot gases and insoluble salts from said chamber.

2. The flash reactor of claim 1 further comprising a first means for cooling said hot gases before exhausting said gases from said chamber, said cooling means including said means for spraying said liquid sanitary waste into said chamber.

3. The flash reactor of claim 2 further comprising control means for regulating the temperature of said exhaust gases after said gases are exhausted from said chamber.

4. The flash reactor of claim 3 wherein said temperature control means includes means for spraying water into the flow of said exhaust gases, said water being vaporized by said gases to thereby cool said gases, and means for controlling the quantity of water sprayed into said gas stream.

5. The flash reactor of claim 4 further comprising means for separating said insoluble salts from said exhausted gases.

6. The flash reactor of claim 5 wherein said temperature control means further comprises means for introducing air at ambient temperature to said exhausted gas stream to thereby cool said exhausted gas stream, and means for regulating the quantity of said air introduced to said gas stream in accordance with the temperature of said gas stream.

* * * * *